United States Patent [19] [11] 4,167,154
Hill [45] Sep. 11, 1979

[54] ANIMAL FEEDER

[76] Inventor: Forest L. Hill, Rte. #1, Box 146, Hillsboro, Ohio 45133

[21] Appl. No.: 848,467

[22] Filed: Nov. 4, 1977

[51] Int. Cl.$^2$ ............................................... A01K 5/00
[52] U.S. Cl. ......................................... 119/53; 119/63
[58] Field of Search .................. 119/53, 52 R, 52 A, 119/52 AF, 52 B, 63, 155

[56] References Cited
U.S. PATENT DOCUMENTS

| | | | |
|---|---|---|---|
| 1,187,307 | 6/1916 | Grossman | 119/63 |
| 1,276,610 | 8/1918 | Barnes | 119/63 |
| 1,449,818 | 3/1923 | Harvey | 119/53 |
| 3,102,511 | 9/1963 | Atcheson | 119/53 |
| 3,861,359 | 1/1975 | Pals | 119/155 |

Primary Examiner—Jay N. Eskovitz
Attorney, Agent, or Firm—Francis T. Kremblas, Jr.

[57] ABSTRACT

An improved animal feeder particularly suitable for hogs, cattle and the like which is characterized by an improved feed control construction which includes a novel threaded drive construction cooperating with an inclined plane connection to a movably mounted feed gate to save time and effort in adjusting the flow of feed to the feeder troughs when required.

4 Claims, 5 Drawing Figures

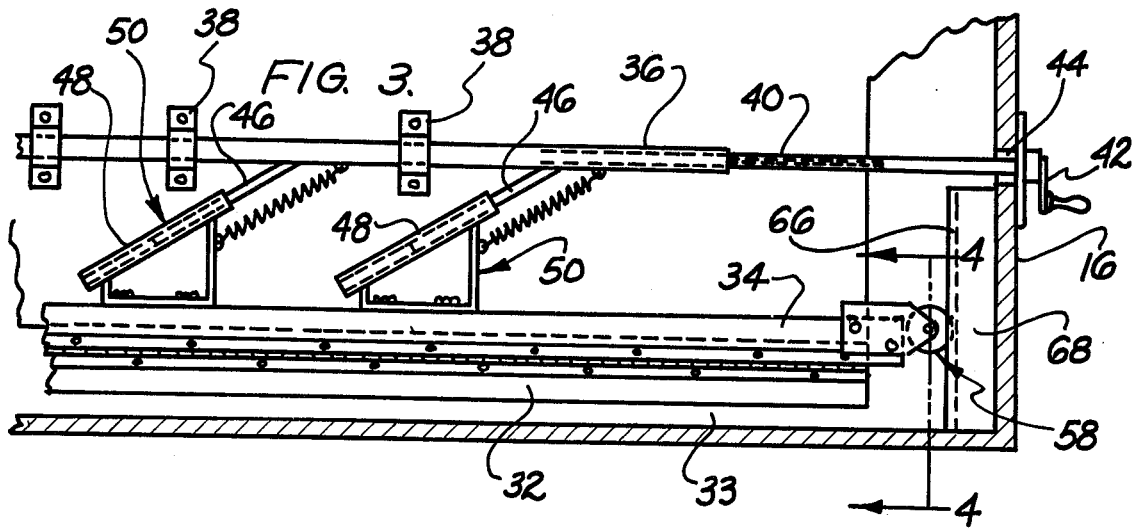
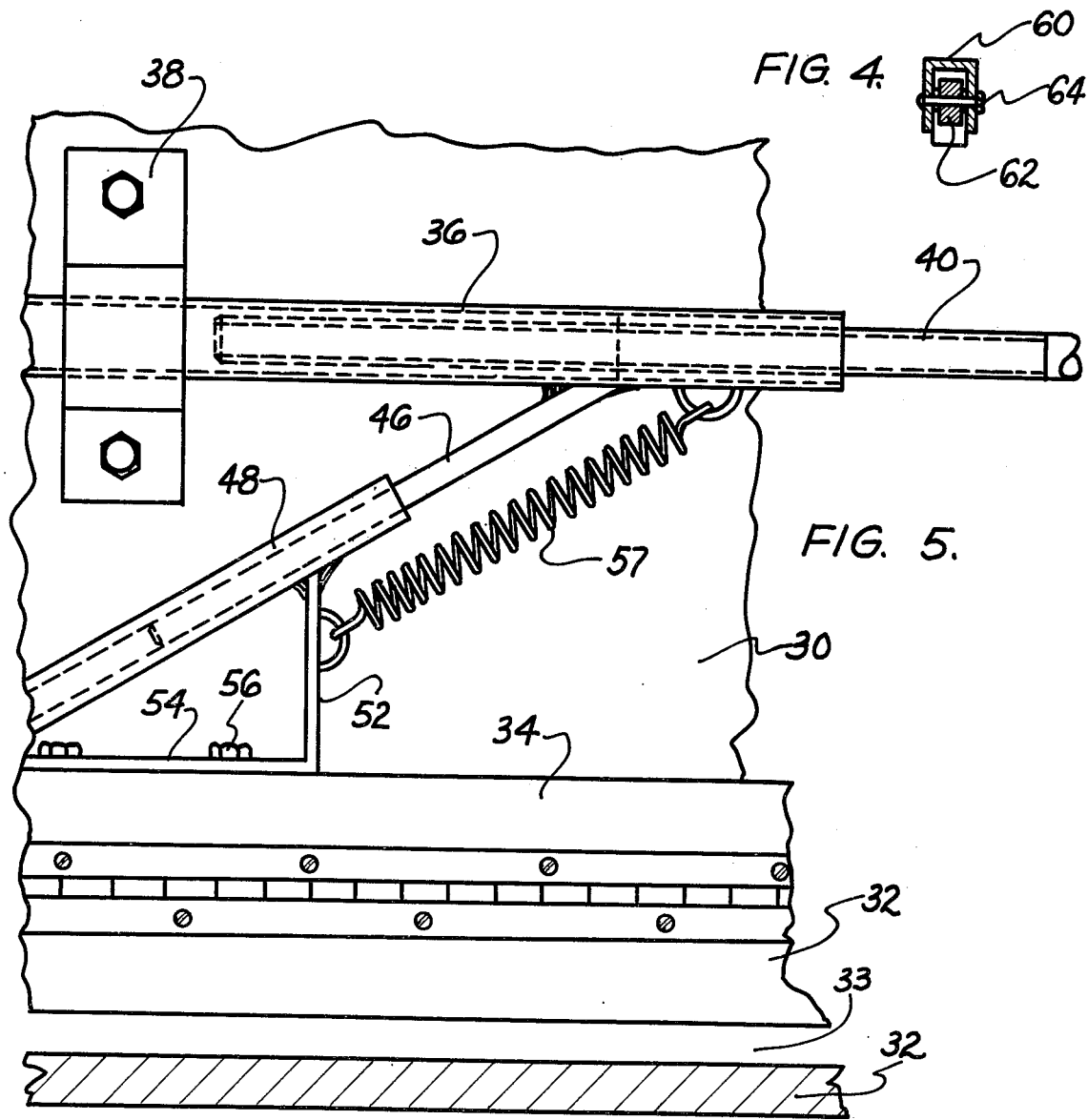

4,167,154

ANIMAL FEEDER

BACKGROUND

Animal feeders of various types are well-known and many constructions have been employed attempting to improve the flow of feed to the animal in the most efficient manner. Many suggested solutions involve relatively expensive and complex constructions. However, those feeders of a type employing large rectangular storage bins above a trough area and utilizing gravity flow are still among the most widely employed. Most of these commercially used feeders still require manual adjustment in a time consuming, laborious and cumbersome process.

For example, typically in order to adjust the feed gate, several bolts, as many as 18 to 24, must be loosened, and the bar raised or lowered as desired. The bolts must then be tightened again. In most instances this procedure requires two persons to accomplish the adjustment since one person must hold the bar while the other tightens the many bolts.

The rate of the flow of feed into the trough compartments is, of course, dependent largely on the size of the feed gate opening. Since the feeds used often develop lumps or clumps, the users tend to set the feed gate opening at a position greater than necessary to supply the animals with a sufficient amount to reduce the incidence of clogging by these lumps. This practice results in a tremendous amount of wasted feed as the animals tend to spill the feed on the ground after satisfying their hunger since the trough fills so quickly.

The difficulty and inconvenience of adjusting the feed gate opening as described above is therefore a cause of expensive and unnecessary waste of animal feed. Prior art solutions have failed to satisfactorily solve this problem by providing an inexpensive construction which is operated in an easy and quick manner.

The improved construction of the present invention permits the user to quickly and easily adjust the feed gate opening such that any clogging can be readily remedied by opening the gate and then easily readjusting it to the proper setting to restore the appropriate rate once the lumps have passed through, as well as make other adjustments dependent upon the need of the animals. Therefore the animals are not deprived of food for any significant time period and a proper feed flow can be more easily maintained in a manner which prompts the user to reduce unnecessary waste.

SUMMARY OF INVENTION

The present invention related generally to animal feeders and particularly to an improved form of the large rectangular bin, gravity flow type which provide individual feeding spaces in an elongated trough. The improvement relates to a simple and convenient construction wherein the feed gate may be adjusted in a quick and easy manner compared to the prior constructions. The feeder of the present invention employs a threaded drive means in combination with a novel feed gate bracket assembly attached to the movable feed gate to permit one person to easily adjust the feed opening to a releasably locked new position.

The bracket is attached to a vertically movable bar forming the upper portion of the feed gate opening and includes an inclined tubular portion which slideably receives a lifting rod connected to a horizontally shiftable tubular rod. The tubular rod is operably connected to a threaded drive rod member which in turn is operatively connected to a crank handle such that rotating the crank and drive rod shifts the tubular rod in a horizontal direction.

This horizontal movement is translated into vertical movement of the feed gate by means of the inclined plane action between the lifting rod and inclined tube forming a portion of the feed gate bracket.

This inexpensive and simple to operate construction permits one person to quickly adjust the feed opening without significant effort to induce more efficient control of the flow of feed to the animals.

OBJECTS

It is primary object of the present invention to provide an animal feeder of the large bin, gravity flow type which possesses a simple and inexpensive feed rate adjustment construction to enable one person to adjust the feed gate setting quickly and easily.

It is another object of the present invention to provide a feeder apparatus of the type described which utilizes a relatively simple threaded drive and inclined plane in a novel combination to provide an improved feed rate control means.

It is a further object of the present invention to provide a feeder apparatus of the type described which promotes the user to more closely monitor the feed flow rate to make more efficient utilization of the feed and thereby reduce unnecessary waste.

IN THE DRAWINGS

FIG. 3 is a partial side sectional view of the apparatus of the preceding Figures illustrating the drive means and bracket combination, which forms the feed rate adjustment means of the present invention;

FIG. 4 is a partial side sectional view illustrating the roller and bracket construction mounted on each end of feed gate bar; and FIG. 5 is a partial view of the drive means and bracket assembly shown in FIG. 3 illustrating the bracket assembly attached to the movable feed bar and horizontally shiftable actuating rod.

DETAILED DESCRIPTION

Figure 1:
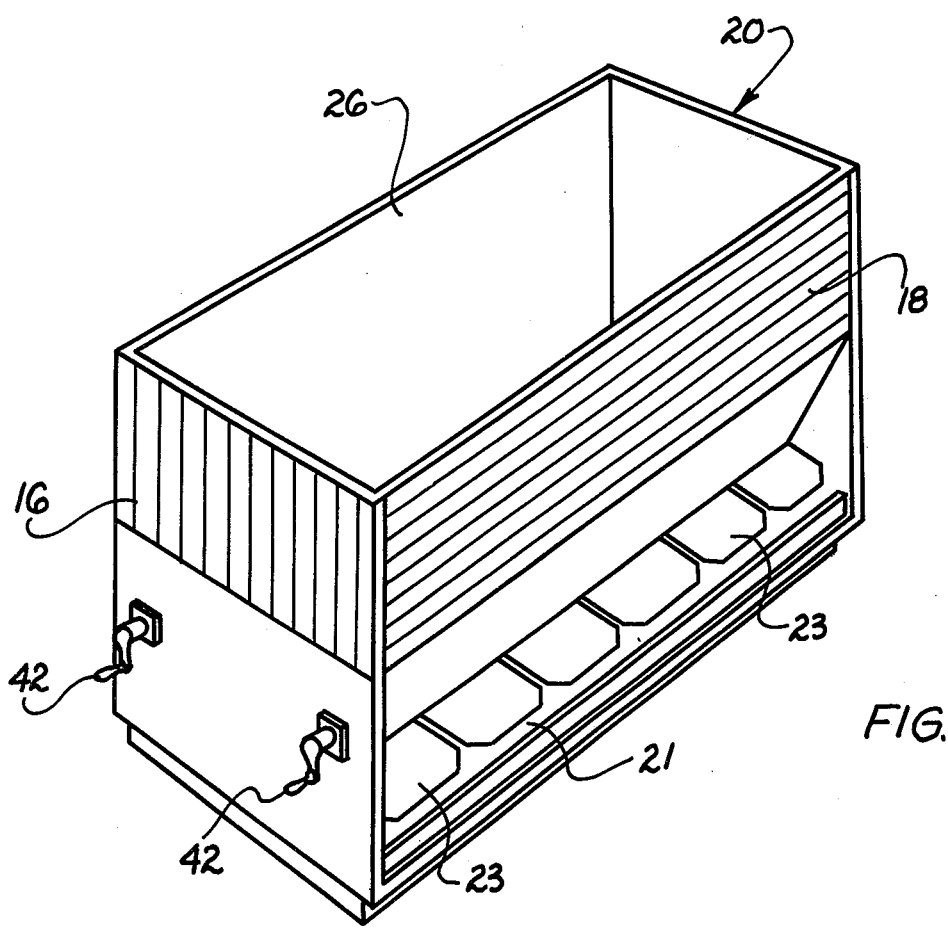
FIG. 1 is a perspective view of a generally typical rectangular bin type animal feeder provided with a feed trough having individual feed spaces and pivotally mounted feed covers.
Figure 2:
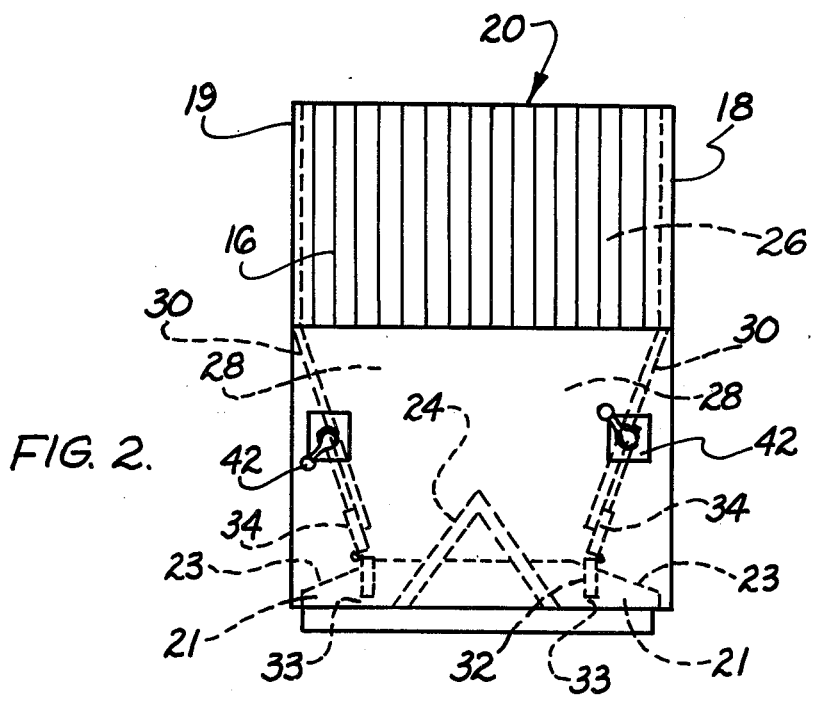
FIG. 2 is a side view of the feeder shown in FIG. 1 showing the actuating means for feed rate adjustment constructed in accordance with the present invention.

Referring specifically to the drawings, a generally rectangular bin, gravity-flow animal feeder indicated generally at 20, of the type greatly preferred by owners of substantial numbers of livestock, is illustrated in FIG. 1. This type of feeder shown is particularly useful for hogs and holds a substantial quantity of feed. Therefore it functions as a convenient storage means requiring less frequent filling and more efficient care of the livestock.

While feeders of this type vary in detail, all are similar in that they include a generally rectangular and relatively large bin storage portion 26. Inner panels divide the lower portion into front and rear feeder throat portions 28 which are formed between respective inclined panels 30 and the inserted V shaped panels 24. The bin storage portion 26 includes a removable top portion, not shown, to enable the feeder to be charged with feed and side walls 16 and 17 and front and rear walls 18 and 19. A front and rear trough 21 is provided with individual feed compartments having conventional, pivoted cover plates 23 which are actuated by the animals nose to permit access to the feed in each trough compartment.

Panels 30 terminate at their lower end to define a feed slot or opening 33 at the lower end of each throat portion 28 formed between the lower edge of each panel 30 and the bottom floor of the bin.

A vertically movable, longitudinally extending bar or gate 34 is provided for adjustment of the feed opening 33 to a desired dimension to regulate the flow of feed from throat 28 into feed trough 21.

Gate 34 may be of conventional form which includes a lower portion 32 which is hingedly mounted such as at 35 to the upper portion 34. The animal, such as a hog, may nose lower portion 32 rearwardly to reach more of the feed.

Referring now to FIGS. 3 and 4, a unique feed rate adjustment means to actuate the movement of feed gate 34 and its associated lower portion 32 is provided which includes a tubular actuating rod 36 which is slideably mounted in C-clamps 38 which are bolted to panel 30 for horizontal movement to either the right or left as seen in FIG. 3. One end of rod 36 includes an inner threaded portion which receives a cooperative threaded portion of a drive rod 40 provided with a handle or crank 42. Rod 40 is conventionally mounted for rotation in bearing member 44 provided in side wall 16 and fixed against lateral movement.

Rod 36 is also provided with fixed lift rods 46 disposed at an inclination relative to the horizontal which are slideably received within the tubular portion 48 of respective feed bar brackets, indicated generally at 50. Bracket 50 include leg portions 52 and a base 54. Base 54 is fixed, such as by bolts 56, to feed gate 34. A resilient means, such as coil spring 57 is connected to rod 36 and bracket 50 which tends to maintain a fixed relationship between rods 46 and tubular portions 48.

Each end of feed bar 34 is preferably provided with a roller assembly, indicated generally at 58 which includes a mounting bracket 60 and a roller 62 rotatably mounted on pin 64.

Rollers 62 are mounted in a track means formed by a groove 66 provided in a side board 68 fixed to side panel 16 to define the vertical path of travel of feed bar 34.

In operation, the user may adjust the rate of flow of feed through feed opening 33 merely by turning crank 42.

Since drive rod 40 is fixed, turning crank 42, clockwise causes tube 36 to move to the right as seen in FIG. 3 which is translated via the inclined plane relationship between lift rods 36 and bracket portions 48, to a downward movement of bar 34. Turning the crank in the opposite direction, therefor raises bar 34. The threaded connection between rod 40 and rod 36 locks the position of feed bar 34 at a given position relative to the movement of crank 42.

The rollers 62 tend to absorb the slight degree of side thrust created and reduces friction to provide relatively easy travel of the bar 34 through the few inches of adjustment generally necessary to adequately control the feed flow rate or to provide a sufficient opening to permit any lumps of feed to pass which may have caused an obstruction.

From the foregoing description it should now be readily apparent that the present invention provides a convenient and simple to operate feed control mechanism for the described animal feeder. Further, the unique construction is relatively simple and inexpensive.

It is also important to point out that the construction of the present invention is readily incorporated into the basic construction of the present types of gravity flow bin feeders such that no substantial manufacturing expense or design changes are necessary to incorporate the present invention. This is not only important to a manufacturer, but it is also important to the ultimate user in that the basic advantages of this type of feeder are preserved while the disadvantageous and cumbersome prior construction presently employed is eliminated.

Prior art attempts to solve this problem have resorted to quite different feeder configurations or have employed quite different approaches to solve the problem which the present invention is directed and as evidenced by the commercial use preferred has not offered satisfactory solutions.

What is claimed is:

1. An improved animal feeder of the type having a storage bin area disposed above a feed discharge area and enclosed within a frame which is provided with a feed discharge opening at its lower end communicating with a feed trough which includes at least one gate member vertically movable to vary the size of said feed discharge opening; the improvement comprising actuator means for varying the vertical position of said movable gate member and including a horizontally disposed actuator rod mounted within said frame adjacent to said feed discharge area for horizontally shiftable movement at a position above said movable gate member; said rod provided with at least one downwardly extending member inclined at a predetermined angle relatie to the horizontal, which is telescopically associated with a similarly inclined member fixed to said movable gate member whereby the horizontal movement of said actuator bar effects a vertical component of force on said gate member.

2. The feeder described in claim 1 wherein said actuator means includes a prime mover means operatively connected to said actuator bar to effect releasably locked positioning of said actuator bar automatically upon ceasing manual manipulation of said prime mover means.

3. The feeder described in claim 2 wherein said prime mover means is a rotatable member mounted on a side wall of said frame means and is threadably connected to said actuator rod to effect horizontal movement of said actuator rod upon rotation of said prime mover means.

4. An improved animal feeder of the type comprising a feeding area disposed beneath a storage bin including a frame means supporting said bin and forming an enclosure surrounding said bin and said feeding area; said feeding area including at least one generally converging feed throat provided with at least one feed discharge opening at its lower end communicating with a feeding trough which is accessible to the animals to be fed; said feed discharge opening including at least one feed gate member mounted for vertical movement for varying the size of said discharge opening; an actuator means operatively connected to said vertically movable feed gate member and including a horizontally shiftable actuator rod provided with at least two downwardly inclined rod like members; and a bracket member fixedly attached to said gate member and provided with a pair of inclined tubular members slideably receiving said inclined rod member fixed to said actuating rod whereby said horizontal movement of said actuating rod effects a vertical movement of said movable gate to permit adjustment of said feed discharge opening.

* * * * *